United States Patent
Ebbrecht et al.

(10) Patent No.: US 6,391,831 B1
(45) Date of Patent: May 21, 2002

(54) USE OF WATER-INSOLUBLE POLYOXYARYLENE-POLYSILOXANE BLOCK COPOLYMERS FOR DEFOAMING AQUEOUS MEDIA

(75) Inventors: Thomas Ebbrecht, Bochum; Wolfgang Josten, Königswinter; Michael Keup, Essen; Stefan Silber, Krefeld; Roland Sucker, Werne, all of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/569,740

(22) Filed: May 11, 2000

(30) Foreign Application Priority Data

May 14, 1999 (DE) .......................... 199 22 351

(51) Int. Cl.$^7$ .................. C10M 145/34; C10M 155/02; B01F 19/04; C08K 5/5419

(52) U.S. Cl. ................. 508/126; 524/267; 524/588; 516/118; 516/119; 516/121; 516/124; 508/208; 106/31.13

(58) Field of Search ................... 516/124, 116, 516/118, 119, 121; 524/588, 837, 838, 267; 556/410, 426, 445, 446; 508/126, 208; 106/31.13, 31.25, 31.26

(56) References Cited

U.S. PATENT DOCUMENTS

| | | | | |
|---|---|---|---|---|
| 2,846,458 A | | 8/1958 | Haluska ..................... | 516/118 |
| 3,423,340 A | * | 1/1969 | Marshall .................... | 516/118 |
| 3,763,021 A | | 10/1973 | Householder ............... | 516/123 |
| 5,247,044 A | * | 9/1993 | Crivello et al. ............... | 528/15 |
| 5,990,187 A | * | 11/1999 | Boinowitz et al. .......... | 521/112 |
| 6,013,683 A | * | 1/2000 | Hill et al. ..................... | 516/67 |
| 6,166,098 A | * | 12/2000 | Burkhart et al. ............ | 521/112 |

FOREIGN PATENT DOCUMENTS

| | | |
|---|---|---|
| DE | 1 012 602 | 7/1957 |
| DE | 1 165 028 | 9/1964 |

OTHER PUBLICATIONS

William C. Griffin, "Calculation of HLB Values of Non--ionic Surfactants", The Journal of the Society of Cosmetic Chemists, vol. V., No. 4, pp. 249–256, Dec. 1954.

* cited by examiner

Primary Examiner—Daniel S. Metzmaier
(74) Attorney, Agent, or Firm—Frommer Lawrence & Haug LLP

(57) ABSTRACT

The invention relates to the use of a water-insoluble polyoxyarylene-polysiloxane block copolymers of the general average formula

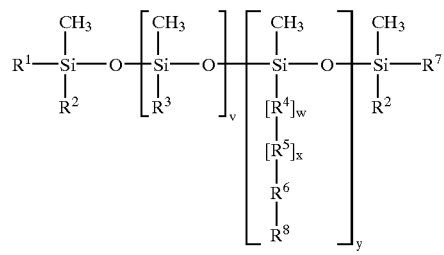

wherein the variables and indices are described herein as defoaming agents for aqueous media. This invention also provides for defoaming compositions comprising said water-insoluble block copolymers.

19 Claims, No Drawings

USE OF WATER-INSOLUBLE POLYOXYARYLENE-POLYSILOXANE BLOCK COPOLYMERS FOR DEFOAMING AQUEOUS MEDIA

RELATED APPLICATIONS

This application claims priority to German application No. 199 22 351.3, filed May 14, 1999, herein incorporated by reference.

BACKGROUND OF THE INVENTION

1. Field of the Invention

The invention relates to the use of water-insoluble polyoxyarylene-polysiloxane block copolymers for defoaming aqueous media.

In numerous industrial processes, aqueous formulations use surface-active substances in order, for example, to emulsify water-insoluble substances or to reduce the interfacial tension and so achieve better wetting characteristics. An unwanted accompanying effect of these surface-active substances, however, is that air introduced during the preparation and processing of such water-based formulations is stabilized as foam. Examples of processes in which such problems occur include papermaking, wastewater treatment, emulsion polymerization, and the manufacture and application of water-dilutable coating systems.

Foam of this kind, produced in the course of stirring or dispersing operations during manufacture or filling, prolongs production times and reduces the effective capacity of the production plant. Foam is disruptive to the application of coating materials since it leads to unwanted surface defects. As a result, the use of antifoams or defoamers in virtually all water-based systems is widespread and often indispensable.

In the past, a large number of formulations have been described which envisage the use of, for example, silicone oils, organomodified siloxanes, hydrophobic polyoxyalkylenes, mineral oils, natural oils and other hydrophobic liquids as defoaming substances. Frequently, the above-mentioned substances are used in combinations with hydrophobic solids, such as pyrogenic silicas, metal stearates or fatty acid amides, for example, which often intensify the foam inhibiting or defoaming effect.

In accordance with the present state of knowledge, it is critical to the defoaming action of a defoamer that it is able to penetrate into the foam lamellae and to weaken them until they collapse. To achieve this requires a controlled incompatibility (hydrophobicity) with the aqueous phase to be defoamed: if a defoamer is too compatible (hydrophilic), it will not be able to be very effective since it does not penetrate preferentially into the foam lamella. If the degree of incompatibility is too great, then defoaming is generally very good but there are frequently the unwanted side effects of surface defects, deterioration in wetting characteristics, and separation phenomena.

Consequently, the search for a suitable defoamer is always a search for the correct incompatibility/compatibility balance for the system to be defoamed, with the aim of getting as close as possible to the target hydrophobicity/hydrophilicity equilibrium.

2. Description of the Related Art

In the past, polyoxyalkylene-polysiloxane block copolymers have proven suitable for allowing this equilibrium to be established in a particularly variable manner, as is described, inter alia, in U.S. Pat. No. 3,763,021.

When polyoxyalkylene-polysiloxane block copolymers are used, advantage is taken of the fact that the polysiloxane blocks can be modified in a targeted manner with polyoxyalkylene units which, by virtue of their composition from hydrophilic and hydrophobic polyoxyalkylene units, can be adapted, in interplay with the polysiloxane block, to the above-mentioned desired hydrophobicity/hydrophilicity equilibrium.

The prior art, an example of which that may be mentioned here is DE-C-1 012 602, includes polyoxyalkylene-polysiloxane block copolymers in which the polyoxyalkylene block is defined as $(C_nH_{2n}O)_x$. The index n is an integer from 2 to 4, it being essential that these polyoxyalkylene blocks always include —$CH_2$—CHR—O— groups as a common structural element, R being a hydrogen atom, a methyl group or an ethyl group. Such polyoxyalkylene blocks are prepared by ionic addition polymerization of oxirane derivatives, such as ethylene oxide, propylene oxide and butylene oxide. Furthermore, it is also possible to use epoxides of longer-chain olefins as well.

Typically, however, polyoxyethylenes and polyoxypropylenes are used in the polyoxyalkylene-polysiloxane block copolymers of the prior art.

By varying the oxyalkylene units, and in particular by modifying their respective proportions and their sequence in the polymer (random and/or in blocks), a large number of polyoxyalkylene-polysiloxane block copolymers are obtainable.

Because of the restriction to these basic units described above, however, in many cases it has not been possible to date to find the optimum incompatibility/compatibility balance required for certain defoamers.

OBJECT OF THE INVENTION

It is therefore an object of the present invention to provide particularly suitable polyoxyalkylene-polysiloxane block copolymers for defoaming aqueous media, said copolymers making it possible to establish the above-described desired incompatibility/compatibility balance in a targeted manner better than as has been possible to date.

SUMMARY OF THE INVENTION

This object is surprisingly achieved by the use of water-insoluble polyoxyarylene-polysiloxane block copolymers for defoaming aqueous media of the general average formula I:

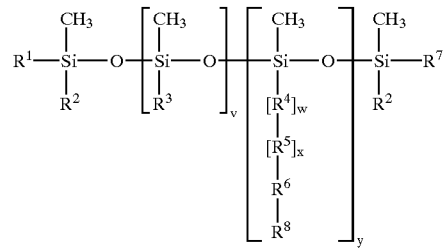

where $R^1$ and/or $R^7$ are $R^2$ or —$[R^4]_w$—$[R^5]_x$—$[R^6]$—$R^8$, $R^2$ and $R^3$ are identical or different alkyl radicals, preferably having 1 to 24 carbon atoms, or are unsubstituted or substituted aryl radicals, preferably having up to 24 carbon atoms, especially phenyl.

$R^4$—is a divalent radical of the formula —O—, —NH—, —$NR^2$—, —S— or of the formula —[O—Si$(CH_3)_2]_u$—, where u is from 2 to 200, $R^5$ is identical or different alkylene radicals, preferably having 1 to 24 carbon atoms, or is $-C_nH_{2n-f}R^2{}_f-O-C_mH_{2m-g}R^2{}_g-$, where f is from 0 to 12,
g is from 0 to 12,
n is from 1 to 18,
m is from 1 to 18, $R^6$ is identical or different radicals of the general formula $-O-C_2H_{4-a}R^9{}_aO)_b(C_2H_{4-a}R^{10}{}_aO)_c-$, where
$R^9$ is identical or different alkyl radicals having 1 to 4 carbon atoms and
$R^{10}$ is a radical of the general formula II

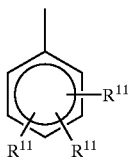

but where, taking into account all radicals $R^6$, the proportion of $C_2H_4O$ groups among the total of all radicals $R^6$ does not exceed 40% by weight, and
$R^{11}$ can be identical or different and is a hydrogen, a hydrocarbon radical, preferably having 1 to 12 carbon atoms, or a halogen atom,
a is from 0 to 3,
b is from 0 to 100,
c is from 1 to 100, and
the sum (b+c) is from 3 to 200
and the sequence of the individual polyoxyalkylene and/or polyoxyarylene segments $-(C_2H_{4-a}R^9{}_aO)_b-$ and $-(C_2H_{4-a}R^{10}{}_aO)_c-$ can be as desired and, in particular, embraces block copolymers, such as random polymers and combinations thereof,
$R^8$ is a hydrogen, a substituted or unsubstituted alkyl radical, preferably having from 1 to 6 carbon atoms, or an acyl radical,
v is from 3 to 200,
w is 0 or 1,
x is 0 or 1,
y is from 0 to 200,
and, if y is 0, $R^1$ and/or $R^7$ are/is $-[R^4]_w-[R^5]_x-[R^6]-R^8$.

As evident from the description given above, the polyoxyarylene-polysiloxane block copolymers described in the context of this invention can also include polyoxyalkylene units in addition to the polyoxyarylene units.

DETAILED DESCRIPTION OF THIS INVENTION

In many cases, polyoxyarylene-polysiloxane block copolymers which have proven highly suitable are those obtained by means of combinations of two polyoxyarylene units with one or more polysiloxane copolymers. In that case, the distinction in the case of the polyoxyarylene copolymers can be a distinction in relation either to the relative proportion of the units used for the preparation of this copolymer or to the molecular weight of the whole polyoxyarylene unit, or else can lie in its functionality.

Different polysiloxane copolymers can be distinguished in accordance with both their molecular mass and their degree of branching or the number and/or relative position of the reactive groups used which are available for linkage.

The mode of action of the compounds of the invention is expressly not that they bring about particularly good compatibilization between constituents of a mixture that differs in polarity. Rather, it is the case that they themselves are just compatible enough not to induce any unwanted side effects such as surface defects, deteriorations in the wetting characteristics, or separation phenomena, without bringing about the compatibilization of other constituents.

An important factor in comparison with the prior art is that the compounds of the invention contain aryl radicals along the $-CH_2-CHR-O-$ chain (for example, R=phenyl) which also have a particularly positive effect on the incompatibility/compatibility balance which is essential for effective defoaming without unwanted side effects.

Such polyoxyarylene-polysiloxane block copolymers can be prepared in accordance with customary methods as in the prior art. As the skilled worker is well aware, such methods include in particular the hydrosilylation reaction of additionally olefinically unsaturated polyoxyarylene-polysiloxane block copolymers with hydropolysiloxanes or the nucleophilic substitution of polyoxyarylene-polysiloxane block copolymers with nucleophilic groups on polysiloxanes containing at least one silicon atom substituted by an electronegative group. Processes of this kind and the preparation of appropriate polysiloxanes are described, for example, in W. Noll "Chemie und Technologie der Silicone", Verlag Chemie, Weinheim, 1968.

In accordance with the prior art, the polyoxyarylene-polysiloxane block copolymers required for this purpose can be obtained by ionic polymerization of appropriately substituted oxirane derivatives.

The polyoxyarylene-polysiloxane block copolymers of the invention acquire their unique properties on the basis of the particular steric requirements of the polyoxyarylenes and of their capacity, markedly different from that of polyoxyalkylenes, to enter into interactions with one another and with other partners.

For the present invention it is essential that the polyoxyarylene-polysiloxane block copolymers of the invention are not water-soluble at the customary processing temperature of the media to be defoamed. This means that a 1:1 mixture (% by weight) with water leads to a nonhomogeneous mixture of the two phases and that no dissolving of the polyoxyarylene-polysiloxane block-copolymers of the invention takes place. However, small fractions of free polyoxyarylenes and/or polyoxyalkylenes may be present in the polyoxyarylene-polysiloxane block copolymers as a result of their preparation, as set out below. Since the preparation of these copolymers essentially obeys the laws of statistics, it is also possible for particularly oxyethylene-rich polyoxyarylenes and/or polyoxyalkylenes to occur, which in turn may be soluble in water. These fractions, however, are very small and in the polyoxyarylene-polysiloxane block copolymers of the invention are always less than 10% by weight.

EXAMPLES

In order to illustrate the claimed compounds, the following polysiloxanes 1 to 3 were reacted, by way of example, with the polyoxyalkylenes and/or polyarylenes 1 to 6:

TABLE 1

| | |
|---|---|
| Polysiloxane 1 | $(CH_3)_3SiO-[(CH_3)_2SiO-]_{20}[(CH_3)HSiO-]_5Si(CH_3)_3$ |
| Polysiloxane 2 | $(CH_3)_2HSiO-[(CH_3)_2SiO-]_{30}[(CH_3)HSiO-]_4SiH(CH_3)_2$ |
| Polysiloxane 3 | $(CH_3)_2ClSiO-[(CH_3)_2SiO-]_{13}SiCl(CH_3)_2$ |
| Polyoxyalkylene and/or -arylene 1 | $H_2C=CH-CH_2O-(C_2H_4O-)_6(CH_2CH(CH_3)O-)_{18}H$ |
| Polyoxyalkylene and/or -arylene 2 | $H_2C=CH-CH_2O-(C_2H_4O-)_{18}(CH_2CH(C_6H_5)O-)_3H$ |
| Polyoxyalkylene and/or -arylene 3 | $H_2C=CH-CH_2O-(C_2H_4O-)_6(CH_2CH(C_6H_5)O-)_{10}H$ |
| Polyoxyalkylene and/or -arylene 4 | $H_3C-CH_2-CH_2-CH_2O)-(C_2H_4O-)_6(CH_2CH(CH_3)O-)_{18}H$ |
| Polyoxyalkylene and/or -arylene 5 | $H_3C-CH_2-CH_2-CH_2O-(C_2H_4O-)_{18}(CH_2CH(C_6H_5)O-)_3H$ |
| Polyoxyalkylene and/or -arylene 6 | $H_3C-CH_2-CH_2-CH_2O-(C_2H_4O-)_6(CH_2CH(C_6H_5)O-)_{10}H$ |

The skilled worker is well aware that the compounds are obtained in the form of mixtures of their homologes and that the indices stated denote average values.

In accordance with the Table below, the following polyoxyalkylene-polysiloxane and/or polyoxyarylene-polysiloxane block copolymers are obtained.

TABLE 2

| Example | Siloxane | Polyoxyalkylene and/or -arylene (eq %) | (eq %) | Inventive yes/no |
|---|---|---|---|---|
| 1 | 1 | 1 (100) | — | no |
| 2 | 1 | 2 (100) | — | no |
| 3 | 1 | 3 (100) | — | yes |
| 4 | 2 | 1 (100) | — | no |
| 5 | 2 | 2 (100) | — | no |
| 6 | 2 | 3 (100) | — | yes |
| 7 | 3 | 4 (100) | — | no |
| 8 | 3 | 5 (100) | — | no |
| 9 | 3 | 6 (100) | — | yes |
| 10 | 3 | 4 (40) | 6 (60) | yes |

Examples 1 to 6 were prepared in accordance with processes customary from the literature, as described, for example, in DE-B-11 65 028; examples 7 to 10 were prepared in accordance with processes customary from the literature, as described, for example, in U.S. Pat. No. 2,846,458.

The skilled worker is well aware that with this mode of preparation, corresponding to the prior art, it is possible for free polyoxyalkylene and/or polyoxyarylene still to be present in the polyoxyalkylene-polysiloxane block copolymers. As a general rule, this is not disruptive and need not be removed for the subsequent use of the compounds.

For use as defoamers, the water-insoluble polyoxyarylene-polysiloxane block copolymers of the invention are advantageously formulated as follows:

a) from 72 to 85% by weight of the polyoxyarylene-polysiloxane block copolymers, b) from 15 to 28% by weight of a nonionic ethoxylate having a ULB of from 8 to 12, and c) from 0.1 to 10% by weight, based on the sum a) + b), of an organic or inorganic solid substance.

Examples of nonionic ethoxylates having a HLB (hydrophilic/lipophilic balance; definition as per W. C. Grifin; J. Soc. Cosmet. Chem., Volume 5, page 249, 1954) of 8–12 are fatty acid esters of polyvalent alcohols, the polyethylene glycol derivatives thereof, polyglycol derivatives of fatty acids and fatty alcohols, alkylphenol ethoxylates, and block copolymers of ethylene oxide and propylene oxide (Pluronics). Preference is given to ethoxylates of raw materials obtainable from naturally occurring fats, especially oleyl derivatives and stearyl derivatives.

Examples of the organic or inorganic solid substances are silicas, alumina, alkaline earth metal carbonates, alkaline earth metal salts of long chain fatty acids, the amides thereof, and urea derivatives. These substances may also have been additionally hydrophobicized in accordance with known methods.

The formulated defoamers described above can be used as they are or in the form of their aqueous emulsion. Emulsions are frequently used with preference since they are easier to meter. Particular preference is given to defoamer emulsions whose average particle diameter lies between 1 and 10 $\mu$m. Such emulsions then contain between 5 and 50% by weight of the polyoxyarylene-polysiloxane block copolymers of the invention.

Performance testing takes place in emulsion paints to which defoamer is added conventionally in amounts of from 0.01 to 0.5% by weight based on the emulsion paint.

The following formulations were prepared and tested:

TABLE 3

| Formulation | Polyoxy-alkylene- and/or polyoxyarylene-polysiloxane block -co-polymer from example | Inventive yes/no |
|---|---|---|
| 1 | 1 | no |
| 2 | 2 | no |
| 3 | 3 | yes |
| 4 | 4 | no |
| 5 | 5 | no |
| 6 | 6 | yes |
| 7 | 7 | no |
| 8 | 8 | no |
| 9 | 9 | yes |
| 10 | 10 | yes |

The compositions of formulations 1 to 9 are as follows:

75% by weight polyoxyalkylene- and/or polyoxyarylene-polysiloxane block copolymer as per Example 1 to 9

20% by weight oleyl ethoxylate with a HLB of 10

5% by weight silica

Testing was carried out in the following emulsion paints:

| Emulsion paint 1 (all amounts in % by weight) | | |
|---|---|---|
| Propylene glycol | 4.7 | |
| Collacral ® AS 35 | 5.0 | BASF |
| (polyacrylate dispersing agent) | | |
| Titanium dioxide | 23.1 | |
| Mergal ® K7 | 0.2 | Riedel de Haen |
| (formaldehyde-free preservative) | | |
| Butyl glycol | 2.6 | |
| Downanol ® DPM | 1.3 | Dow |
| (dipropylene glycol methyl ether) | | |
| Water | 6.8 | |
| Acronal ® A603 | 52.3 | BASF |
| (acrylate dispersion) | | |
| Rheolate ® 278 | 4.0 | Rheox |
| (polyurethane-based thickener) | | |
| Emulsion paint 2 (all amounts in % by weight) | | |
| Water | 36.4 | |
| Coatex ® P50 | 0.4 | Coatex |
| (polyurethane-based thickener) | | |
| Calgon ® N | 0.1 | BK Ladenburg |
| (sodium polyphosphate) | | |
| Mergal ® K7 | 0.2 | Riedel de Haen |
| (formaldehyde-free preservative) | | |
| Coatex ® BR100 | 2.3 | Coatex |
| (polyurethane-based thickener) | | |
| Calcidar ® Extra | 22.1 | Omya |
| (calcium carbonate) | | |
| Titanium dioxide | 17.5 | |
| Finntalc ® M15 | 4.7 | |
| (talcum) | | |
| NaOH, 10% | 0.1 | |
| Acronal ® 290D | 16.2 | BASF |
| (styrene acrylate dispersion) | | |

The emulsion paints were formulated in accordance with the prior art. All raw materials were used without further purification. To end, 0.06% by weight of defoamer (formulation 1 to 10) was added and was incorporated by stirring at 1000 rpm for 1 minute.

A so-called roller test was carried out, the result of which is shown in the Tables below. The roller test firstly allows comparison to be made under conditions close to those in practice and secondly offers the possibility of reasonable differentiation of different formulations.

For the roller test, 40 grams of the test emulsion paint are spread using an open-pored foam roller onto a nonabsorbent test card having a total surface area of 500 cm². Prior to the application of the paint, the foam roller is wetted with water. It must be ensured that the additional amount of water introduced into the applied paint is always the same, so that the drying time of the paint always remains the same. The wet film add on is approximately 300 g/m². After 24 hours of drying time, the test cards are examined in accordance with the following criteria:

a) Macrofoam (number of bubbles per 100 cm²)

b) Microfoam (number of pinholes in comparison to photos of reference cards on a scale of 1 (very few or no pinholes) to 5 (very large number of pinholes))

c) Wetting defects (none, slight, severe).

The tests were repeated with emulsion paints which had been admixed with defoamer and kept at 50° C. for 6 weeks. Results for emulsion paint 1:

TABLE 4

| Formu- | Macrofoam | | Microfoam | | Wetting defects | |
|---|---|---|---|---|---|---|
| lation | immediate | 6 weeks | immediate | 6 weeks | immediate | 6 weeks |
| none | 80 | 80 | 5 | 5 | none | none |
| 1 | 1 | 3 | 1 | 2 | none | slight |
| 2 | 71 | 86 | 3 | 3 | slight | slight |
| 3 | 0 | 1 | 1 | 1 | none | none |
| 4 | 2 | 6 | 1 | 2 | none | slight |
| 5 | 56 | 65 | 2 | 3 | severe | severe |
| 6 | 0 | 0 | 1 | 1 | none | none |
| 7 | 1 | 8 | 1 | 2 | slight | slight |
| 8 | 27 | 31 | 2 | 2 | slight | severe |
| 9 | 0 | 0 | 1 | 1 | none | none |
| 10 | 0 | 0 | 0 | 1 | none | none |

Results for emulsion paint 2:

TABLE 5

| Formu- | Macrofoam | | Microfoam | | Wetting defects | |
|---|---|---|---|---|---|---|
| lation | immediate | 6 weeks | immediate | 6 weeks | immediate | 6 weeks |
| None | 50 | 50 | 4 | 4 | none | none |
| 1 | 1 | 6 | 1 | 2 | none | slight |
| 2 | 58 | 61 | 3 | 3 | none | slight |
| 3 | 0 | 3 | 1 | 1 | none | none |
| 4 | 2 | 10 | 1 | 2 | none | slight |
| 5 | 39 | 45 | 2 | 3 | severe | severe |
| 6 | 0 | 1 | 1 | 1 | none | none |
| 7 | 3 | 9 | 2 | 2 | slight | slight |
| 8 | 19 | 25 | 1 | 2 | slight | severe |
| 9 | 0 | 0 | 1 | 1 | none | none |
| 10 | 0 | 0 | 0 | 2 | none | none |

It is found that the polyoxyarylene-polysiloxane block copolymers of the invention, which are present in the formulations 3, 6, 9 and 10, offer outstanding possibilities for adapting the properties to the requirements of defoaming aqueous media. Surprisingly, it is possible to achieve particular effects which are not possible even with comparably insoluble polyoxyalkylene-polysiloxane block copolymers based on substituted or unsubstituted oxirane derivatives.

The above description is intended to be illustrative and not limiting. Various changes and modifications in the embodiments described herein may occur to those skilled in the art. Those changes can be made without departing from the scope of the invention.

What is claimed is:

1. A method for defoaming aqueous media which comprises adding to the aqueous media a defoamer comprising a water-insoluble polyoxyarylene-polysiloxane block copolymer of the general average formula

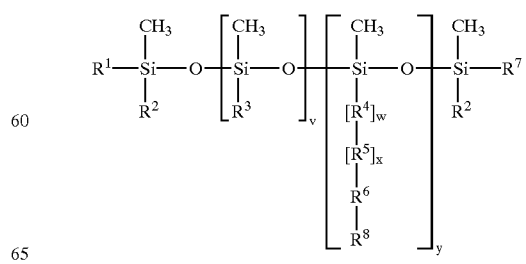

where
- $R^1$ and/or $R^7$ are $R^2$ or $-[R^4]_w-[R^5]_x-R^6-R^8$,
- $R^2$ and $R^3$ are identical or different alkyl radicals or are unsubstituted or substituted aryl radicals,
- $R^4$ is a divalent radical of the formula $-O-$, $-NH-$, $-NR^2-$, $-S-$ or of the formula $-[O-Si(CH_3)_2]_u-$,
  where
  u is from 2 to 200,
- $R^5$ is identical or different alkylene radicals, or is $-C_nH_{2n-f}R^2_f-O-C_mH_{2m-g}R^2_g-$,
  where
  f is from 0 to 12,
  g is from 0 to 12,
  n is from 1 to 18,
  m is from 1 to 18,
- $R^6$ is identical or different radicals of the general formula $-O-(C_2H_{4-a}R^9_aO)_b(C_2H_{4-a}R^{10}_aO)_c-$,
  where
  $R^9$ is identical or different alkyl radicals and
  $R^{10}$ is a radical of the general formula II

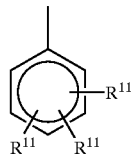

but where, taking into account all radicals $R^6$, the proportion of $C_2H_4O$ groups among the total of all radicals $R^6$ does not exceed 40% by weight, and wherein at least one $R^{10}$ is present, and
$R^{11}$ can be identical or different and is a hydrogen, a hydrocarbon radical or a halogen atom,
a is individually from 0 to 3,
b is from 0 to 100,
c is from 1 to 100, and
the sum (b+c) is from 3 to 200
and the sequence of the individual polyoxyalkylene and/or polyoxyarylene segments $-(C_2H_{4-a}R^9_aO)_b-$ and $-(C_2H_{4-a}R^{10}_aO)_c-$ is either random or block or combination thereof,
$R^8$ is a hydrogen, a substituted or unsubstituted alkyl radical or an acyl radical,
v is from 3 to 200,
w is 0 or 1,
x is 0 or 1,
y is from 0 to 200,
and, if y is 0, $R^1$ and/or $R^7$ are/is $-[R^4]_w-[R^5]_x-R^6-R^8$.

2. The method according to claim 1, where
$R^1$ and/or $R^7$ are $R^2$ or $-[R^4]_w-[R^5]_x-R^6-R^8$,
$R^2$ and $R^3$ are identical or different alkyl radicals having 1 to 24 carbon atoms or are unsubstituted or substituted aryl radicals having up to 24 carbon atoms,
$R^4$ is a divalent radical of the formula $-O-$, $-NH-$, $-NR^2-$, $-S-$ or of the formula $-[O-Si(CH_3)_2]_u-$,
where
u is from 2 to 200,
$R^5$ is identical or different alkylene radicals having 1 to 24 carbon atoms, or is $-C_nH_{2n-f}R^2_f-O-C_mH_{2m-g}R^2_g-$, where
f is from 0 to 12,
g is from 0 to 12,
n is from 1 to 18,
m is from 1 to 18,
$R^6$ is identical or different radicals of the general formula $-O-(C_2H_{4-a}R^9_aO)_b(C_2H_{4-a}R^{10}_aO)_c-$,
where
$R^9$ is identical or different alkyl radicals having 1 to 4 carbon atoms and
$R^{10}$ is a radical of the general formula II

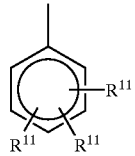

but where, taking into account all radicals $R^6$, the proportion of $C_2H_4O$ groups among the total of all radicals $R^6$ does not exceed 40% by weight, and
$R^{11}$ can be identical or different and is a hydrogen, a hydrocarbon radical having 1 to 12 carbon atoms, or a halogen atom,
a is from 0 to 3,
b is from 0 to 100,
c is from 1 to 100, and
the sum (b+c) is from 3 to 200
and the sequence of the individual polyoxyalkylene and/or polyoxyarylene segments $-(C_2H_{4-a}R^9_aO)_b-$ and $-(C_2H_{4-a}R^{10}_aO)_c-$ is either random or block or combinations thereof,
$R^8$ is a hydrogen, a substituted or unsubstituted alkyl radical having from 1 to 6 carbon atoms, or an acyl radical,
v is from 3 to 200,
w is 0 or 1,
x is 0 or 1,
y is from 0 to 200,
and, if y is 0, $R^1$ and/or $R^7$ are/is $-[R^4]_w-[R^5]_x-R^6-R^8$.

3. The method according to claim 1, in where at least 80% of the groups $R^2$ and $R^3$ are methyl groups,
$R^1=R^7$,
$R^{11}$ is H,
and the sum v+y is from 8 to 120.

4. The method according to claim 1, where
$R^1=R^7$ and is $-(CH_2)_3-$,
$R^5$ is $-(CH_2)_3-$,
w is 0, and
x is 1.

5. The method according to claim 1, where
$R^1=R^7$ and is $-(CH_2)_3R^6-R^8$,
$R^5$ is $-(CH_2)_3-$,
w is 0, and
x is 1.

6. The method according to claim 1, where
$R^1=R^7$ and is $-(CH_2)_3-R^6-R^8$,
y is 0.

7. The method according to claim 1, where
$R^1=R^7$ and is $-(CH_2)_3-R^6-R^8$, $R^4$ is —[O—Si(CH$_3$)$_2$]$_u$—,
$R^8$ is an unbranched alkyl radical,
u is from 2 to 6,
w is 1,
x is 0, and
y is from 2 to 6.

8. The method according to claim 1, where
$R^1=R^7$ and is —(CH$_2$)$_3$—R$^6$—R$^8$,
$R^8$ is an unbranched alkyl radical
y is 0.

9. The method according to claim 1 where c is from 2 to 5.

10. The method according to claim 1 where the individual polyoxyalkylene and polyoxarylene units are arranged in blocks.

11. The method according to claim 1 where the (C$_2$H$_{4-a}$R$^{10}_a$O)$_c$ groups are arranged in blocks directly adjacent to $R^8$.

12. The method according to claim 1, wherein the defoamer further comprises an emulsifier.

13. The method according to claim 1, wherein the defoamer further comprises solids.

14. The method according to claim 1, wherein the defoamer is an aqueous emulsion.

15. A method for defoaming cooling lubricants, which comprise adding to the cooling lubricants a defoaming composition comprising a water-insoluble polyoxyarylene block copolymer of the average general formula

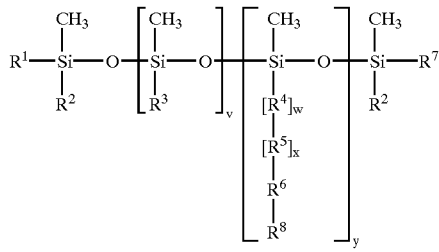

where
$R^1$ and/or $R^7$ are $R^2$ or —[R$^4$]$_w$—[R$^5$]$_x$—R$^6$—R$^8$,
$R^2$ and $R^3$ are identical or different alkyl radicals or are unsubstituted or substituted aryl radicals,
$R^4$ is a divalent radical of the formula —O—, —NH—, —NR$^2$—, —S— or of the formula —[O—Si(CH$_3$)$_2$]$_u$—,
where
u is from 2 to 200,
$R^5$ is identical or different alkylene radicals or is —C$_n$H$_{2n-f}$R$^2_f$—O—C$_m$H$_{2m-g}$R$^2_g$—,
where
f is from 0 to 12,
g is from 0 to 12,
n is from 1 to 18,
m is from 1 to 18,
$R^6$ is identical or different radicals of the general formula
—O—(C$_2$H$_{4-a}$R$^9_a$O)$_b$(C$_2$H$_{4-a}$R$^{10}_a$O)$_c$—,
where
$R^9$ is identical or different alkyl radicals and
$R^{10}$ is a radical of the general formula II

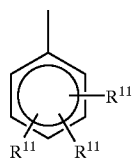

but where, taking into account all radicals R$^6$, the proportion of C$_2$H$_4$O groups among the total of all radicals R$^6$ does not exceed 40% by weight, and wherein at least one R$^{10}$ is present, and
$R^{11}$ can be identical or different and is a hydrogen, a hydrocarbon radical having 1 to 12 carbon atoms, or a halogen atom,
a is individually from 0 to 3,
b is from 0 to 100,
c is from 1 to 100, and
the sum (b+c) is from 3 to 200
and the sequence of the individual polyoxyalkylene and/or polyoxyarylene segments —(C$_2$H$_{4-a}$R$^9_a$O)$_b$— and —(C$_2$H$_{4-a}$R$^{10}_a$O)$_c$— is either random or block or combination thereof,
$R^8$ is a hydrogen, a substituted or unsubstituted alkyl radical or an acyl radical,
v is from 3 to 200,
w is 0 or 1,
x is 0 or 1,
y is from 0 to 200,
and, if y is 0, $R^1$ and/or $R^7$ are/is —[R$^4$]$_w$—[R$^5$]$_x$—R$^6$—R$^8$.

16. A method for defoaming a polymer dispersion which comprise adding to the polymer dispersion a defoaming composition comprising a water-insoluble polyarylene block copolymer of the average general formula

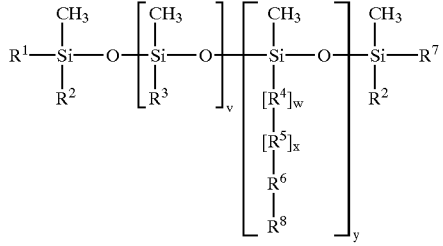

where
$R^1$ and/or $R^7$ are $R^2$ or —[R$^4$]$_w$—[R$^5$]$_x$—R$^6$—R$^8$,
$R^2$ and $R^3$ are identical or are unsubstituted or substituted aryl radicals,
$R^4$ is a divalent radical of the formula —O—, —NH—, —NR$^2$—, —S— or of the formula —[O—Si(CH$_3$)$_2$]$_u$—,
where
u is from 2 to 200,
$R^5$ is identical or different alkylene radicals or is —C$_n$H$_{2n-f}$R$^2_f$—O—C$_m$H$_{2m-g}$R$^2_g$—,
where
f is from 0 to 12,
g is from 0 to 12,
n is from 1 to 18,
m is from 1 to 18,
$R^6$ is identical or different radicals of the general formula
—O—(C$_2$H$_{4-a}$R$^9_a$O)$_b$(C$_2$H$_{4-a}$R$^{10}_a$O)$_c$—, where
R$^9$ is identical or different alkyl radicals and
R$_{10}$ is a radical of the general formula II

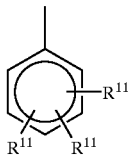

but where, taking into account all radicals R$^6$, the proportion of C$_2$H$_4$O groups among the total of all radicals R$^6$ does not exceed 40% by weight, and wherein at least one R$^{10}$ is present, and R$^{11}$ can be identical or different and is a hydrogen, a hydrocarbon radical having 1 to 12 carbon atoms, or a halogen atom, a is individually from 0 to 3,
b is from 0 to 100,
c is from 1 to 100, and
the sum (b+c) is from 3 to 200
and the sequence of the individual polyoxyalkylene and/or polyoxyarylene segments —(C$_2$H$_{4-a}$R$^9_a$O)$_b$— and —(C$_2$H$_{4-a}$R$^{10}_a$O)$_c$— is either random or block or combination thereof, R$^8$ is a hydrogen, a substituted or unsubstituted alkyl radical or an acyl radical,
v is from 3 to 200,
w is 0 or 1,
x is 0 or 1,
y is from 0 to 200,
and, if y is 0, R$^1$ and/or R$^7$ are/is —[R$^4$]$_w$—[R$^5$]$_x$—R$^6$—R$^8$.

17. A method for defoaming a coating material or printing ink, which comprise adding to the coating material or printing ink a water-insoluble polyoxyarylene block copolymer of the average general formula

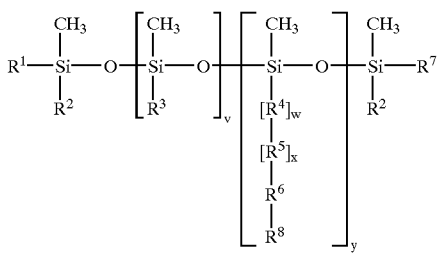

where
R$^1$ and/or R$^7$ are R$^2$ or —[R$^4$]$_w$—[R$^5$]$_x$—R$^6$—R$^8$,
R$^2$ and R$^3$ are identical or different alkyl radicals or are unsubstituted or substituted aryl radicals,
R$^4$ is a divalent radical of the formula —O—, —NH—, —NR$^2$—, —S— or of the formula —[O—Si(CH$_3$)$_2$]$_u$—,
where
u is from 2 to 200,
R$^5$ is identical or different alkylene, radicals or is —C$_n$H$_{2n-f}$R$^2_f$—O—C$_m$H$_{2m-g}$R$^2_g$—,
where
f is from 0 to 12,
g is from 0 to 12,
n is from 1 to 18,
m is from 1 to 18, R$^6$ is identical or different radicals of the general formula —O—(C$_2$H$_{4-a}$R$^9_a$O)$_b$(C$_2$H$_{4-a}$R$^{10}_a$O)$_c$—,
where
R$^9$ is identical or different alkyl radicals and
R$^{10}$ is a radical of the general formula II

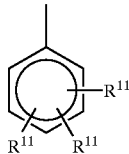

but where, taking into account all radicals R$^6$, the proportion of C$_2$H$_4$O groups among the total of all radicals R$^6$ does not exceed 40% by weight, and wherein at least one R$^{10}$ is present, and R$^{11}$ can be identical or different and is a hydrogen, a hydrocarbon radical having 1 to 12 carbon atoms, or a halogen atom, a is individually from 0 to 3,
b is from 0 to 100,
c is from 1 to 100, and
the sum (b+c) is from 3 to 200
and the sequence of the individual polyoxyalkylene and/or polyoxyarylene segments —(C$_2$H$_{4-a}$R$^9_a$O)$_b$— and —(C$_2$H$_{4-a}$R$^{10}_a$O)$_c$— is either random or block or combination thereof, R$^8$ is a hydrogen, a substituted or unsubstituted alkyl radical or an acyl radical,
v is from 3 to 200,
w is 0 or 1,
x is 0 or 1,
y is from 0 to 200,
and, if y is 0, R$^1$ and/or R$^7$ are/is —[R$^4$]$_w$—[R$^5$]$_x$—R$^6$—R$^8$.

18. An emulsion paint or printing ink which comprises an emulsion paint or printing ink and a water-insoluble polyarylene block copolymer of the average general formula

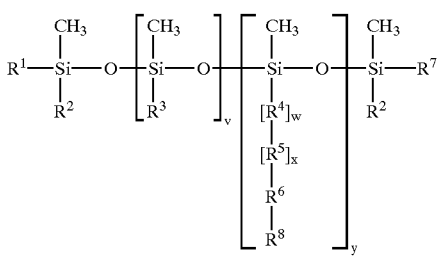

where
R$^1$ and/or R$^7$ are R$^2$ or —[R$^4$]$_w$—[R$^5$]$_x$—R$^6$—R$^8$,
R$^2$ and R$^3$ are identical or different alkyl radicals or are unsubstituted or substituted aryl radicals,
R$^4$ is a divalent radical of the formula —O—, —NH—, —NR$^2$—, —S— or of the formula —[O—Si(CH$_3$)$_2$]$_u$—,
where
u is from 2 to 200,
R$^5$ is identical or different alkylene radicals or is —C$_n$H$_{2n-f}$R$^2_f$—O—C$_m$H$_{2m-g}$R$^2_g$—,
where
f is from 0 to 12,
g is from 0 to 12, n is from 1 to 18,
m is from 1 to 18,
$R^6$ is identical or different radicals of the general formula
—O—$(C_2H_{4-a}R^9{}_aO)_b(C_2H_{4-a}R^{10}{}_aO)_c$—,
where
$R^9$ is identical or different alkyl radicals and
$R^{10}$ is a radical of the general formula II

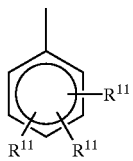

but where, taking into account all radicals $R^6$, the proportion of $C_2H_4O$ groups among the total of all radicals $R^6$ does not exceed 40% by weight, and wherein at least one $R^{10}$ is present, and
$R^{11}$ can be identical or different and is a hydrogen, a hydrocarbon radical having 1 to 12 carbon atoms, or a halogen atom,
a is individually from 0 to 3,
b is from 0 to 100,
c is from 1 to 100, and
the sum (b+c) is from 3 to 200
and the sequence of the individual polyoxyalkylene and/or polyoxyarylene segments —$(C_2H_{4-a}R^9{}_aO)_b$— and —$(C_2H_{4-a}R^{10}{}_aO)_c$— is either random or block or combination thereof,
$R^8$ is a hydrogen, a substituted or unsubstituted alkyl radical or an acyl radical,
v is from 3 to 200,
w is 0 or 1,
x is 0 or 1,
y is from 0 to 200,
and, if y is 0, $R^1$ and/or $R^7$ are/is —$[R^4]_w$—$[R^5]_x$—$R^6$—$R^8$.

19. A cooling lubricant which comprises a cooling lubricant and a water-insoluble polyarylene block copolymer of the average general formula

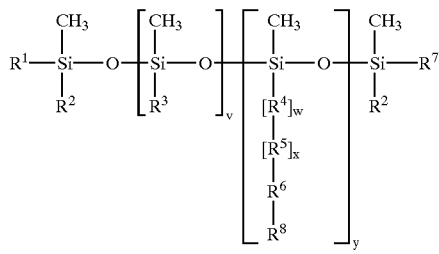

where
$R^1$ and/or $R^7$ are $R^2$ or —$[R^4]_w$—$[R^5]_x$—$R^6$—$R_8$,
$R^2$ and $R^3$ are identical or different alkyl radicals or are unsubstituted or substituted aryl radicals,
$R^4$ is a divalent radical of the formula —O—, —NH—, —$NR^2$—, —S— or of the formula —[O—Si$(CH_3)_2]_u$—,
where
u is from 2 to 200,
$R^5$ is identical or different alkylene radicals or is —$C_nH_{2n-f}R^2{}_f$—O—$C_mH_{2m-g}R^2{}_g$—,
where
f is from 0 to 12,
g is from 0 to 12,
n is from 1 to 18,
m is from 1 to 18,
$R^6$ is identical or different radicals of the general formula
—O—$(C_2H_{4-a}R^9{}_aO)_b(C_2H_{4-a}R^{10}{}_aO)_c$—,
where
$R^9$ is identical or different alkyl radicals and
$R^{10}$ is a radical of the general formula II

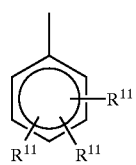

but where, taking into account all radicals $R^6$, the proportion of $C_2H_4O$ groups among the total of all radicals $R^6$ does not exceed 40% by weight, and wherein at least one $R^{10}$ is present, and
$R^{11}$ can be identical or different and is a hydrogen, a hydrocarbon radical having 1 to 12 carbon atoms, or a halogen atom,
a is individually from 0 to 3,
b is from 0 to 100,
c is from 1 to 100, and
the sum (b+c) is from 3 to 200
and the sequence of the individual polyoxyalkylene and/or polyoxyarylene segments —$(C_2H_{4-a}R^9{}_aO)_b$— and —$(C_2H_{4-a}R^{10}{}_aO)_c$— is either random or block or combination thereof,
$R^8$ is a hydrogen, a substituted or unsubstituted alkyl radical or an acyl radical,
v is from 3 to 200,
w is 0 or 1,
x is 0 or 1,
y is from 0 to 200,
and, if y is 0, $R^1$ and/or $R^7$ are/is —$[R^4]_w$—$[R^5]_x$—$R^6$—$R^8$.

* * * * *